March 6, 1951      S. KRONHAUS      2,544,505
SELF-LOADING WHEELBARROW
Filed Dec. 14, 1946
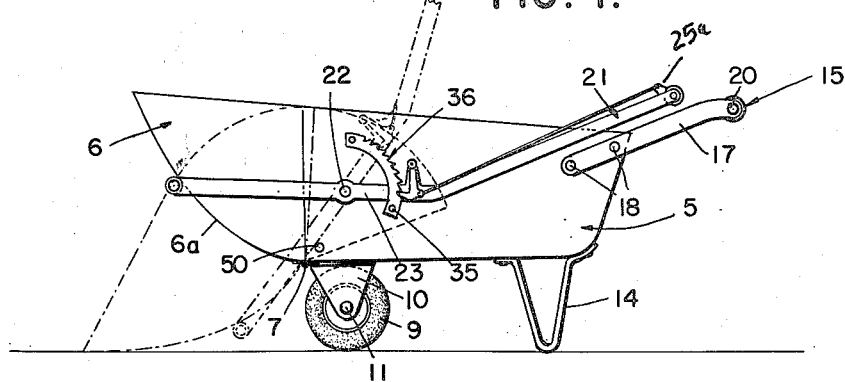
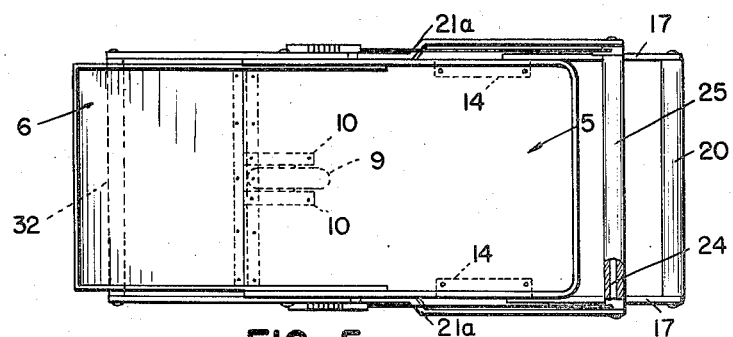
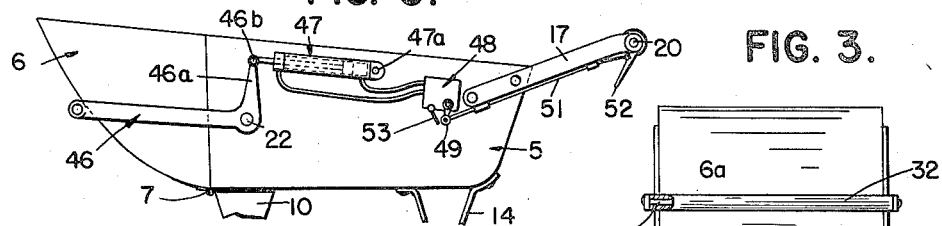
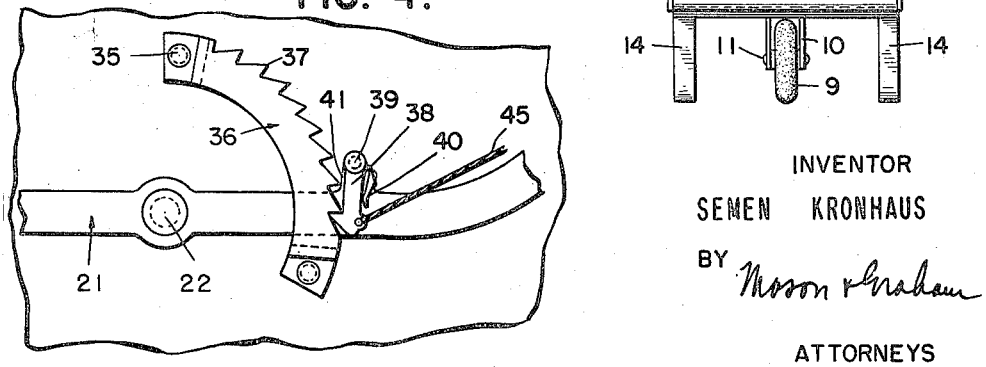
INVENTOR
SEMEN KRONHAUS
BY *Mason & Graham*
ATTORNEYS Patented Mar. 6, 1951

2,544,505

UNITED STATES PATENT OFFICE 2,544,505

SELF-LOADING WHEELBARROW

Semen Kronhaus, Los Angeles, Calif.

Application December 14, 1946, Serial No. 716,338

3 Claims. (Cl. 214—78)

This invention has to do with self-loading wheelbarrows, having as an object the provision of a wheelbarrow so constructed as to be capable of scooping up cargo from the ground and elevating it into the hopper.

Another object of the invention is the provision of novel and efficient means for operating and locking the scoop member.

Other objects and advantages of the invention will appear from the following description of a presently preferred embodiment, for which purpose I shall refer to the accompanying drawings, wherein:

Fig. 1 is a side elevation of a wheelbarrow embodying my invention;

Fig. 2 is a top plan view;

Fig. 3 is a front end elevation;

Fig. 4 is an enlarged fragmentary elevational view; and

Fig. 5 is a side elevation showing a modified embodiment of my invention.

Referring now to the drawings, the numeral 5 generally designates the hopper and the numeral 6 the scoop or front portion of the hopper.

The scoop is pivotally connected to the hopper adjacent its lower right-hand corners by hinges 7, the open end of the hopper and the open end of the scoop being so proportioned that, when closed (full line position of Fig. 1), the side walls of hopper somewhat overlap the side walls of the scoop to prevent leakage.

A wheel 9 is mounted in an inverted U-shaped bracket 10 by spindle 11, the bracket being suitably secured to the bottom of the hopper adjacent its front end. A pair of U-shaped feet 14 are secured to and depend from the rear portion of the hopper.

The handle bars, generally denoted 15, consist of two backwardly and upwardly disposed arms 17 secured, as by rivets or bolts 18, to the hopper. A cross rod 20 extends between and secures the outer ends of the arms together.

For raising and lowering the scoop, I provide parallel levers 21 pivotally connected to the hopper at 22, each having an angular bend 23 between its ends so that the right-hand ends of the levers may be in convenient position for manual operation.

A cross bar 24 extends between and is secured at its ends to the right-hand ends of the levers, having rotatably mounted thereon a sleeve or handle 25. The sleeve preferably has a slight friction fit on the bar 24 but is rotatable thereon when small manual rotative pressure is exerted. Each of the levers has an angular bend 21a between its ends (Fig. 2) so that the right-hand ends of the levers will clear the arms 17, if necessary.

The front ends of the levers are secured together by a cross rod 30 which rod rotatably carries a sleeve or roller 32. The roller 32 rotates along the front curved surface 6a of the scoop as the scoop is being raised and lowered.

Secured to the opposite sides of the hopper, as by rivets or bolts 35, I provide a pair of arched ratchet members 36 each presenting teeth 37 with which a pawl 38 selectively engages to lock the levers in any desired position. There are two of the pawls 38, one for each ratchet member, and each of the pawls is pivotally connected at one end to its carrying lever by a pivot pin 39 and is yieldably urged into engagement with the teeth by a leaf spring 40. Pins 39 and springs 40 are supported by bosses 41, one on each of the levers. In most cases a single pawl and ratchet will suffice.

To actuate the pawls 38 in one direction—that is, to free them from engagement with the teeth to permit swinging movement of the lever—I provide for each pawl a cable 45, each of which cables is secured at one end to its pawl and is connected at its opposite end to a radial arm 26 fixed on sleeve 25, so that rotation of the sleeve 25 in one direction functions to withdraw the pawls from engagement with the teeth and thereby to free the levers for swinging movement.

To scoop up a load from the ground, the pawls are thus actuated and the levers 21 swing from the full line position to the dotted line position of Fig. 1, in which latter position the levers abut stop pins 50 which project laterally from the opposite sides of the hopper. The wheelbarrow is then pushed forwardly and when the cargo is thus within the scoop, the lever will swing to the full line position of Fig. 1, which moves the load into the hopper. Unloading of the cargo may be accomplished by actuation of the parts in the opposite direction.

In order to reduce to a minimum the manual effort required to scoop up the cargo, I illustrate in Fig. 5 a means to elevate the scoop 6 through the medium of a motor, the motive element in this particlar illustration being an hydraulic pump.

In the drawing, numeral 46 designates a lever whose forward portion simulates that of the lever 21 in the before-mentioned arrangement and is pivoted as at 22. An extension 46a, shown at approximately 90° from the axis of the forward portion, terminates in a pivotal connection 46b, the pin of which couples the piston rod of the cylinder assembly 47. The cylinder assembly 47 is pivoted at 47a to compensate for radial movement of the lever 46.

The numeral 48 designates a conventional hydraulic pump whose operating lever 49 is shown as being connected by the rod 51 to the actuating handle 52 pivotally mounted on the handle bar 20. Trip lever 53 of pump 48, provides means to release the fluid pressure on the forward end of cylinder 47, allowing the scoop to descend to a selected elevation. Elevating the scoop is accomplished by actuating the lever 52 toward the operator, the lever being returned to its normal position by a spring (not shown) within the pump assembly. A plurality of pumping cycles are required, the exact number depending on the height the scoop must be elevated.

Two cylinder assemblies may be employed in the same manner as for the ratchet mechanism previously described, in which case the pump would supply both cylinders. The hydraulic system being of the "closed" circuit type, any intermediate position of the scoop would obviously be locked against movement in either direction.

I claim:

1. In a wheelbarrow, the combination of a hopper comprised of a rear portion and a separate portion, said front portion having an outwardly curved bottom wall, and being hingedly secured adjacent its bottom rear end portion to the rear hopper portion whereby to be swingable relative thereto about an axis transverse of the hopper, a handlebar for the rear hopper portion, a pair of parallel levers fulcrumed between their ends to the respective sides of the rear hopper portion, the rear ends of the levers being normally disposed adjacent the handle bar, a handle disposed between the rear ends of the levers, a cross member disposed between and rotatably mounted at its ends on the front end portions of the levers, said cross member having rolling engagement with the curved bottom wall of the front portion of the hopper, a lock releasably securing the levers in selected positions, and a wheel portably supporting the rear hopper portion.

2. In a wheelbarrow, the combination of a hopper comprised of a rear portion and a separate portion, said front portion having an outwardly curved bottom wall, and being hingedly secured adjacent its bottom rear end portion to the rear hopper portion whereby to be swingable relative thereto about an axis transverse of the hopper, a handlebar for the rear hopper portion, a pair of parallel levers fulcrummed between their ends to the respective sides of the rear hopper portion, the rear ends of the levers being normally disposed adjacent the handle bar, a handle connecting the rear ends of the levers and rotatably secured thereto, the front end portions of the levers having operative engagement with the front portion of the hopper, a ratchet carried by the rear hopper portion, a pawl carried by one of the levers and having engagement with the ratchet, a radial arm on said handle, a link operatively connecting the arm to the pawl, and a wheel portably supporting the rear hopper portion.

3. In a wheelbarrow, the combination of a hopper comprised of a rear portion and a separate portion, said front portion having an outwardly curved bottom wall, and being hingedly secured adjacent its bottom rear end portion to the rear hopper portion whereby to be swingable relative thereto about an axis transverse of the hopper, a handlebar for the rear hopper portion, a pair of parallel levers fulcrummed between their ends to the respective sides of the rear hopper portion, the rear ends of the levers being normally disposed adjacent the handle bar, a handle disposed between the rear ends of the levers, a cross member disposed between and rotatably mounted at its ends on the front end portions of the levers, said cross member having rolling engagement with the curved bottom wall of the front portion of the hopper, abutment members on the rear hopper portion engageable by the levers when the front portion of the hopper is swung into its lowered position, a lock releasably securing the levers in selected positions, and a wheel portably supporting the rear hopper portion.

SEMEN KRONHAUS.

REFERENCES CITED

The following references are of record in the file of this patent:

UNITED STATES PATENTS

| Number | Name | Date |
| --- | --- | --- |
| 251,194 | Cushing et al. | Dec. 20, 1881 |
| 515,679 | Hawkins | Feb. 27, 1894 |
| 1,185,658 | Hagerty | June 6, 1916 |
| 2,037,222 | Farrar | Apr. 14, 1936 |
| 2,286,947 | Bankson | June 16, 1942 |
| 2,439,001 | Hippard | Apr. 6, 1948 |

FOREIGN PATENTS

| Number | Country | Date |
| --- | --- | --- |
| 5,943 | Great Britain | Mar. 26, 1892 |
| 492,591 | France | Mar. 27, 1919 |
| 118,067 | Australia | Jan. 25, 1944 |